(No Model.)

P. RICHTER.
CONFECTIONERY.

No. 279,812. Patented June 19, 1883.

WITNESSES:
Jo. P. Grant,
W. F. Kirches

INVENTOR:
Paul Richter,
BY John A. Diedersheim
ATTORNEY.

N. PETERS. Photo-Lithographer, Washington, D. C.

UNITED STATES PATENT OFFICE.

PAUL RICHTER, OF PHILADELPHIA, PENNSYLVANIA, ASSIGNOR TO WM. RECKERSDRES, OF SAME PLACE.

CONFECTIONERY.

SPECIFICATION forming part of Letters Patent No. 279,812, dated June 19, 1883.

Application filed December 6, 1882. (No model.)

*To all whom it may concern:*

Be it known that I, PAUL RICHTER, a subject of Germany, residing in the city and county of Philadelphia, State of Pennsylvania, have invented a new and useful Improvement in Confectionery, which improvement is fully set forth in the following specification and accompanying drawings, in which—

Figure 1:
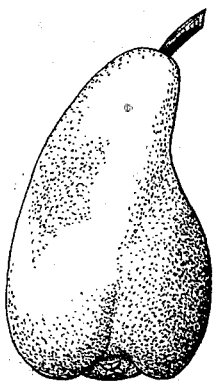
Figure 2:
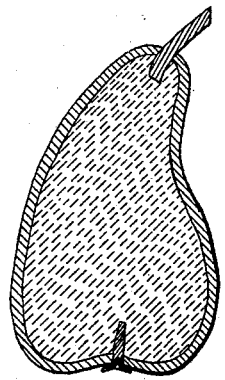

Figure 1 is a side elevation of a piece of confectionery embodying my invention. Fig. 2 is a vertical section thereof.

Similar letters of reference indicate corresponding parts in the two figures.

My invention consists of the manufacture of confectionery of the form of fruit and other objects, the inside of which is composed of cream, paste, &c., and the outside is a skin or shell, which strengthens and protects the body and presents a beautiful and natural appearance.

In carrying out my invention I take one pound of sugar and boil it with a sufficient quantity of water. The sirup is then worked on a slab until it is what is known as "cream." One pound of ground or beaten almonds and one pound of sugar are now boiled with a suitable quantity of water and allowed to cool, after which the mass is mixed with the cream, and to the mixture is added one pound of powdered or pulverized sugar and a desirable amount of fruit-juice or other flavoring matter. The mass thus formed is sufficiently dried, and then molded, cast, or otherwise shaped in the form of the fruit or other object as the body of the confectionery, suitable stems or handles being inserted at the proper time, the above proportions making about four pounds.

I now make a dip or coating, taking the white of twenty eggs, one-quarter pound gelatine, one-quarter pound alum, fifty drops acetic acid, and fifteen pounds of sugar, making a large quantity of dip to be used for many pounds of the molded objects. The white of the eggs, one half of the sugar, and the acid are stirred together in a cool state, making preparation No. 1. The gelatine, the other half of the sugar, and the alum are well worked together, and make preparation No. 2. The two preparations are then united, and into the same are dipped the molded or shaped objects, thus thoroughly coating the latter, forming the skin of the same, the coated article then being allowed to dry, said skin being of the contour of the object, with a smooth surface, and of a consistency which is sufficiently hard, and may be readily broken or cut and eaten, the alum employed serving to set and harden the mass of which the coating is composed. The proper tinting, coloring, &c., is applied, and other finishes may be added, if desired.

It will be seen that the body is of the form of cream or paste of delicious flavor, and the dip or coating strengthens and protects the body, the appearance of the objects being beautiful and attractive, and closely imitating nature.

Having thus described my invention, what I claim as new, and desire to secure by Letters Patent, is—

1. An article of confectionery composed of a body of paste, cream, &c., of the form of fruit, &c., and a hardened shell or skin composed of materials which strengthen and protect said body and imitate the fruit, &c., substantially as herein set forth.

2. The body composed of the preparation of cream, almonds, water, and flavor, substantially as described.

3. The coating composed of the white of eggs, gelatine, alum, acetic acid, and sugar, substantially as described.

PAUL RICHTER.

Witnesses:
JOHN A. WIEDERSHEIM,
A. P. GRANT.